Oct. 1, 1968          G. GAZZANI          3,403,961
APPARATUS FOR THE CONTROLLED DISTRIBUTION OF LIQUIDS, IN
PARTICULAR FOR TOILETRY
Filed Feb. 27, 1967
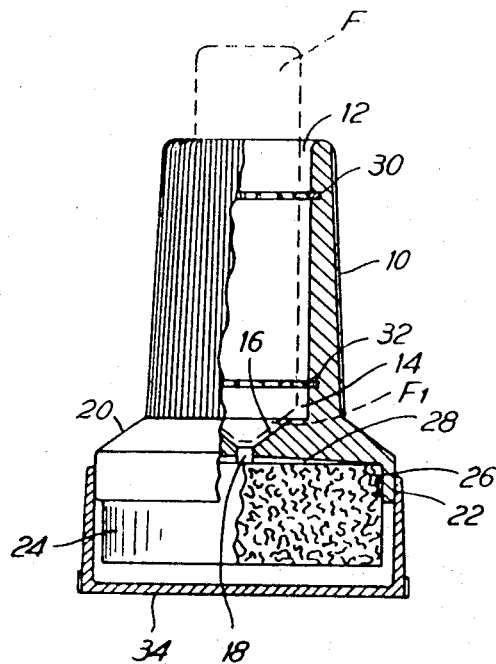
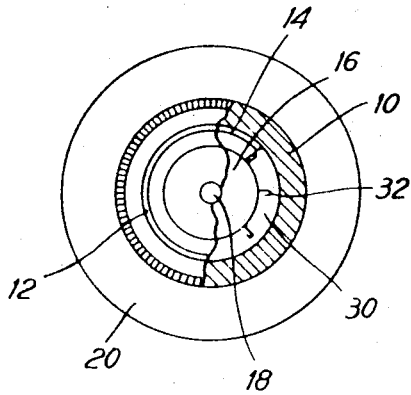
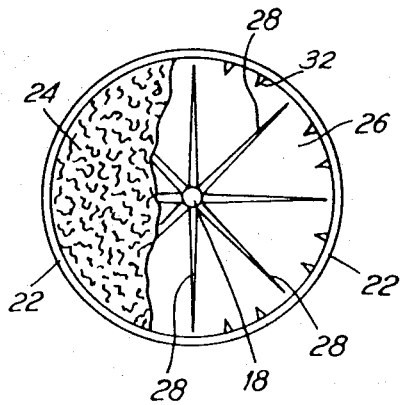
INVENTOR
GIOVANNI GAZZANI
BY *Woodhams, Blanchard & Flynn*
ATTORNEYS United States Patent Office 3,403,961
Patented Oct. 1, 1968

3,403,961
APPARATUS FOR THE CONTROLLED DISTRIBUTION OF LIQUIDS, IN PARTICULAR FOR TOILETRY
Giovanni Gazzani, Como, Italy, assignor to Neotis S.a.s., Como, Italy
Filed Feb. 27, 1967, Ser. No. 618,637
Claims priority, application Italy, Mar. 3, 1966, 4,746/66, Patent 15,145
5 Claims. (Cl. 401—202)

ABSTRACT OF THE DISCLOSURE

A dispensing device consisting of a hollow handle and distributor means provided with a calibrated opening to convey the content of the phial housed in said handle.

This invention concerns a device for the delivery and distribution of liquids in general, as required for the application of lotions, for sanitary purposes, toiletry and also for the treatment of the skin, in the sense to perform a mechanical or frictional action on the skin simultaneously to the distribution of the lotion in order to facilitate the penetration of the liquid.

At present, the liquids used for hygienic purposes, for treatments, toiletry or other similar purposes, are made up in phials, containing a certain quantity of liquid for one or more applications.

A typical, but not exclusive case, is that of the application of hair lotions which is presently performed in an irrational and inconvenient way, particularly with reference to the friction which is necessarily to follow the distribution of the lotion on the skin. The said operations, besides resulting inconvenience, are not devoid of other drawbacks, due to the mouth of the phial containing the liquid, which is sharp and irregular, thus preventing, on the one hand, the continuous and controlled delivery of the liquid and, on the other hand, is liable to produce cuts and wounds.

The scope of this invention is, to obviate the abovt mentioned and other drawbacks and to allow a controlled delivery and simultaneous distribution of the liquid and also, if desired, skin friction, to facilitate penetration and absorption of the delivered solution.

The device according to this invention is characterized by a hollow grip, designed to house a head provided with a calibrated opening which can be connected, at one end, with the mouthpiece of a phial or like container which can be housed in the above-mentioned grip and, at the other end, with liquid distributing members supported by the head itself. The members for the controlled delivery of the liquid can be of a suitable type, in order to meet the user's requirements and according to the features of the liquid to be distributed, for instance, such members can consist of at least one cushion or pad of permeable, flexibly deformable material, or, otherwise, of a surface provided with very small holes, through which the liquid is delivered.

To guarantee communication between the phial and the grip provided with an opening, said opening of said grip is provided with annular, flexibly deformable parts which, adhering to the outer wall of the phial, firmly grip said phial, at the same time preventing the undesirable spillage of the liquid, particularly when the device is at rest.

The invention will now be explained in the following description, in which reference is made to the attached drawing, showing, by way of example, a preferred embodiment of the distributor device according to the invention.

FIGURE 1 shows the distributor device in front elevation, with parts in cross section;

FIGURE 2 is a plan view, also with partially removed parts;

FIGURE 3 is a view from bottom to the top.

The device as illustrated consists of a grip-shaped body 10 which, in the case illustrated, is in the shape of a truncated-cone shape, the outer surface of which is knurled, for easy gripping. The body 10 is provided with a cylindrically shaped hollow space or seat 12, conveniently sized to house a phial F or a like container as described below, the lower end of said phial being closed by a bottom plate 14. The latter is provided with a shaped groove 16 to house the small mouth or end $F_1$ of phial F. The central part of groove 16 is provided with one or several openings 18 having a convenient diameter, to allow for the regular and continuous delivery of the liquid contained in phial F.

In connection with the delivery of the liquid, groove 16 is shaped in such a way as to allow the entrance of the air into the phial in substitution of the liquid delivered. The small base-plate 14 forms an integral part of head 20 located at the lower end of the hollow body 10. Said head is provided with a crown 20 which forms a housing to retain a distributor means 24. In the illustrated case, the distributor means 24 consists of a pad of porous flexibly deformable material; said pad advantageously consists of a small block of expanded resin of the open cell type, said pad or block being conveniently fixed, for instance, by means of adhesives or projecting ridges in the housing formed by crown 22, in a manner such that one of the ends of said pad or block adheres to the bottom 26 of the above mentioned housing which communicates with opening 18 as previously mentioned.

To allow distribution of the whole quantity of liquid through the cellular pad 24, the end of head 20, i.e., the bottom 26 of the housing formed by crown 22, is provided with slots 28 which, in the illustrated case, extend radially with cross section tapering toward the circumference of head 20.

To guarantee a hold of phial F to hollow body 10, as well as the connection of the small mouth $F_1$ of said phial with hole 18, the cylindrical opening 12 is provided with one or more flexible gaskets 30 which are held in the said opening by means of annular slots.

The inner edge of the said gasket cooperates, under flexible constriction, with the outer wall of phial F, in such a way as to guarantee the engagement of the small mouth $F_1$ of the latter with notch 16, while the empty phial can be easily removed and replaced with a new phial, at the other end.

To allow the flow of air through phial F and to improve the flexibility of gaskets 30, the inner edges of the latter are provided with radial slots 32 which, besides allowing for the passage of the air into the phial, prevent the escape of the liquid, even when the device is tilted or when it is not used. For this purpose, the sizing of slots 32, in particular their widths, are advantageously designed according to the density of the liquid.

It follows from the foregoing that, if the apparatus is maintained in the position shown in FIGURE 1, the liquid contained in phial F flows out by gravity (or otherwise by mechanical action of initial shaking) and passes through hole 18, into slots 28, to soak pad 24. In these conditions, the user can distribute the liquid over the skin or other objects, performing, at the same time, friction on the desired part, to facilitate penetration and absorption of the liquid. The liquid removed from pad 24 is uniformly substituted by a mechanical or squeezing action, or by a capillary action provided by the porous material of pad 24, through the gauged opening 18 and slots 28. The outflow of the liquid from phial F is made possible by the weight of the liquid itself and by the above mentioned capillary action; the air is allowed to flow freely into the phial, through the hollow space formed by hole 12, and by the outer wall of the phial, as well as through the above mentioned slots 32. The empty phial can be quickly replaced with a new one to allow the uninterrupted distribution of the liquid.

The above described and illustrated device, besides offering the advantages already specified in the foregoing, also consents using the contents of one phial successively, for two or more applications; this is possible because the device according to the present invention allows closing and protecting the initially opened phial. It is, in fact, possible to protect the surface of pad 24 from atmospheric agents, in particular from dust, by covering the same with a small cap 34 of a flexible material which is held in position by flexible constriction by crown 22.

Obviously, the member designed to distribute the liquid can be of a porous and rigid nature; in this case crown 22 retains a cap of naturally porous material which is of a material made porous by a plurality of small holes, through which the liquid is conveyed. In this case, said cap can be movably fitted to crown 22, in such a way that the latter forms in conjunction with bottom wall 26, a collecting chamber, capable of containing a certain quantity of liquid which is issued through the holes of the above mentioned cap. In consideration of the requirements connected with the application of lotions, or, in general, of liquids for hygienic purposes, for treatments or for other purposes, the device of the present invention can be so realized as to meet the requirements connected with the make-up and packaging the liquid containing phials. For instance, the said device can advantageously integrate a package of lotions contained in phials or in like containers.

The details of realization of the device, as well as its final use can be varied, without surpassing the limits of the present invention.

I claim:

1. A device for dispensing liquids from the open end of a phial, comprising:
    an elongated and hollow handle having a head portion at one end thereof and having side wall means and one end wall adjacent said head portion defining a chamber open at the opposite end thereof, the major part of said phial being slidtably received within said chamber with the open end of said phial adjacent said end wall;
    deformable and porous pad means secured to said head portion externally of said chamber;
    at least one opening extending through said end wall for communication between said chamber and said porous pad means;
    resiliently deformable means mounted on said side wall means within said chamber and adapted to hold said phial in spaced relationship with respect to said side wall means, said deformable means providing at least one axial passageway between said side wall means and said phial, said open end of said phial being held in close communication with said opening in said end wall so that the contents thereof can flow through said opening and into said porous pad, air being permitted to flow between said phial and said side wall means to replace the contents of said phial flowing through said opening.

2. The dispensing device defined in claim 1, wherein said head portion projects laterally of said handle, and said end wall has a plurality of radial slots extending from said opening and adjacent said porous pad whereby said contents of said phial can distribute itself on said porous pad.

3. The dispensing device defined in claim 2, wherein the cross-sectional area of each radial slot is progressively decreased radially outwardly.

4. The device defined in claim 1, wherein said head portion includes a first annular flange extending around at least a portion of said porous pad means, and including a cap having a bottom wall and a second annular flange, the free edge of said second flange being telescopically engageable with said first flange for holding said device in an upright position when said bottom wall rests upon a substantially horizontal surface.

5. The device defined in claim 1, wherein said deformable means comprises a pair of spaced annular gaskets having radial slots of width sufficient to pass air but insufficient to pass an appreciable quantity of said contents.

References Cited

UNITED STATES PATENTS

| | | | |
|---|---|---|---|
| 3,016,561 | 1/1962 | Hulsh | 15—565 |
| 3,106,742 | 10/1963 | Schultz et al. | 15—565 |
| 3,046,593 | 7/1962 | Goldman et al. | 15—565 |
| 3,133,308 | 5/1964 | Claypool | 15—565 |

FOREIGN PATENTS 1,407,207  6/1965  France.

CHARLES A. WILLMUTH, *Primary Examiner.*

ROBERT I. SMITH, *Assistant Examiner.*